(12) United States Patent
Kuroiwa (10) Patent No.: US 8,482,233 B2
(45) Date of Patent: Jul. 9, 2013

(54) HARD DISC DEVICE CONTROL CIRCUIT AND HARD DISC DEVICE

(75) Inventor: Hiroshi Kuroiwa, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 364 days.

(21) Appl. No.: 12/908,900

(22) Filed: Oct. 21, 2010

(65) Prior Publication Data

US 2011/0102931 A1    May 5, 2011

(30) Foreign Application Priority Data

Nov. 4, 2009    (JP) ................ 2009-252547

(51) Int. Cl.
*H02P 6/14*    (2006.01)

(52) U.S. Cl.
USPC ................. 318/400.26; 318/400.29

(58) Field of Classification Search
USPC .............. 318/400.26, 400.29, 560
See application file for complete search history.

(56) References Cited

U.S. PATENT DOCUMENTS

| | | | | |
|---|---|---|---|---|
| 5,965,871 A | * | 10/1999 | Zhou et al. | 250/208.1 |
| 6,046,470 A | * | 4/2000 | Williams et al. | 257/328 |
| 6,760,381 B2 | * | 7/2004 | Lu | 375/257 |
| 2003/0193764 A1 | * | 10/2003 | Ziemer et al. | 361/18 |
| 2003/0227707 A1 | | 12/2003 | Kokami et al. | |
| 2010/0321846 A1 | * | 12/2010 | Fukami | 361/91.5 |

FOREIGN PATENT DOCUMENTS

JP    2004-86982 A    3/2004

* cited by examiner

*Primary Examiner* — Rina Duda
(74) *Attorney, Agent, or Firm* — Mattingly & Malur, PC (57) ABSTRACT

A head of a hard disc device is retracted to a predetermined position by operating a VCM (Voice Coil Motor) driver. Trouble in a hard disc is detected and retraction is performed even if a short circuit occurs in either of the output line of a VCM driver in an input end of a high potential side or in an input end of a low potential side. A ground short circuit is detected in each side separately and different retracting methods are executed for each case.

4 Claims, 10 Drawing Sheets

HARD DISC DEVICE CONTROL CIRCUIT AND HARD DISC DEVICE

CROSS-REFERENCE TO RELATED APPLICATION

The disclosure of Japanese Patent Application No. 2009-252547 filed on Nov. 4, 2009 including the specification, drawings and abstract is incorporated herein by reference in its entirety.

BACKGROUND OF THE INVENTION

The present invention relates to a method of retracting a head of a hard disc device when trouble occurs and particularly, to a method of detecting a short circuit of a terminal on the side that supplies a current to a VCM.

In a hard disc device, when some anomaly occurs, it is necessary to protect the device and data. In such a case, it is necessary to retract a head over a medium to a predetermined position by operating a VCM (Voice Coil Motor) driver.

However, of output lines VCM(+) and VCM(−) of the VCM driver, when the line corresponding to the source side of a retract current is short-circuited to the ground, it is no longer possible to retract the head. Further, a voltage is applied to the line short-circuited to the ground as a result, therefore, there is a possibility of the destruction of the VCM driver by an unexpectedly high current.

Japanese Patent Laid-Open No. 2004-86982 (Patent Document 1) discloses that when the power source is shut off in the magnetic disc storage device, the head is retracted both safely and quickly.

It is also possible to employ another method of retracting a head by sensing an overcurrent. As this method, there is a method of simultaneously detecting a current to a spindle motor and a current the VCM driver causes to flow to the VCM.

SUMMARY OF THE INVENTION

However, according to the invention described in Patent Document 1, it is not possible to operate the VCM depending on short-circuited positions. Specifically, if the VCM(+) on the high potential side is short-circuited to the ground, no current flows to the VCM(−) side and the retract operation itself is not performed any longer.

Further, according to the method of simultaneously detecting a current to a spindle motor and a current the VCM driver causes to flow to the VCM, there is such a problem that the addition of a current is detected, and therefore, the respective detection precisions are degraded.

The present invention has been made in view of the above circumstances and provides a means that detects a short circuit of the output line of the VCM driver to the ground in the VCM(+) and VCM(−) separately and executes different retracting methods for each case.

The other purposes and the new feature of the present invention will become clear from the description of the present specification and the accompanying drawings.

The following explains briefly the outline of a typical invention among the inventions disclosed in the present application.

A hard disc device control circuit according to a typical embodiment of the present invention is characterized by having a voice coil motor, a first switch that controls the supply of current from a power source to the voice coil motor, an amplifier circuit that drives a gate terminal of the first switch, and an anomaly detection circuit and characterized in that the first switch has a source terminal, a drain terminal, and the gate terminal and the anomaly detection circuit detects a short circuit in an input end on the high potential side of the voice coil motor by monitoring the voltage between gate and source and the voltage between drain and source of the first switch.

The hard disc device control circuit may be characterized by further having a first comparator that compares the voltage between gate and source with a first threshold voltage and which becomes active when the voltage between gate and source exceeds the first threshold voltage and a second comparator that compares the voltage between drain and source with a second threshold voltage and which becomes active when the voltage between drain and source exceeds the second threshold voltage and characterized in that the anomaly detection circuit detects a short circuit by determining that a short circuit has occurred in the input end on the high potential side of the voice coil motor when both the first comparator and the second comparator become active.

The hard disc device control circuit may be characterized by further having a negative regulator that generates a negative potential and a second switch that controls the coupling between the negative regulator and the input end on the low potential side of the voice coil motor and characterized in that the anomaly detection circuit couples the negative regulator and the input end on the low potential side of the voice coil motor via the second switch when a short circuit occurs in the input end on the high potential side of the voice coil motor.

The hard disc device control circuit may be characterized in that the anomaly detection circuit terminates the supply of current from the constant current source to the voice coil motor via the amplifier circuit and the first switch when a short circuit occurs in the input end on the high potential side of the voice coil motor.

Hard disc devices including these hard disc device control circuits are also included in the range of the present invention.

The following explains briefly the effect acquired by the typical invention among the inventions disclosed in the present application.

By using the method of detecting trouble in a hard disc according to a typical embodiment of the present invention, it is made possible to perform the detection of trouble and retraction even if a short circuit occurs in either of the VCM (+) and the VCM(−). As a result, it is made possible to improve the reliability and safety of a hard disc device.

DETAILED DESCRIPTION OF THE PREFERRED EMBODIMENTS

Embodiments of the present invention are explained below using the drawings.

(First Embodiment)

Figure 1:
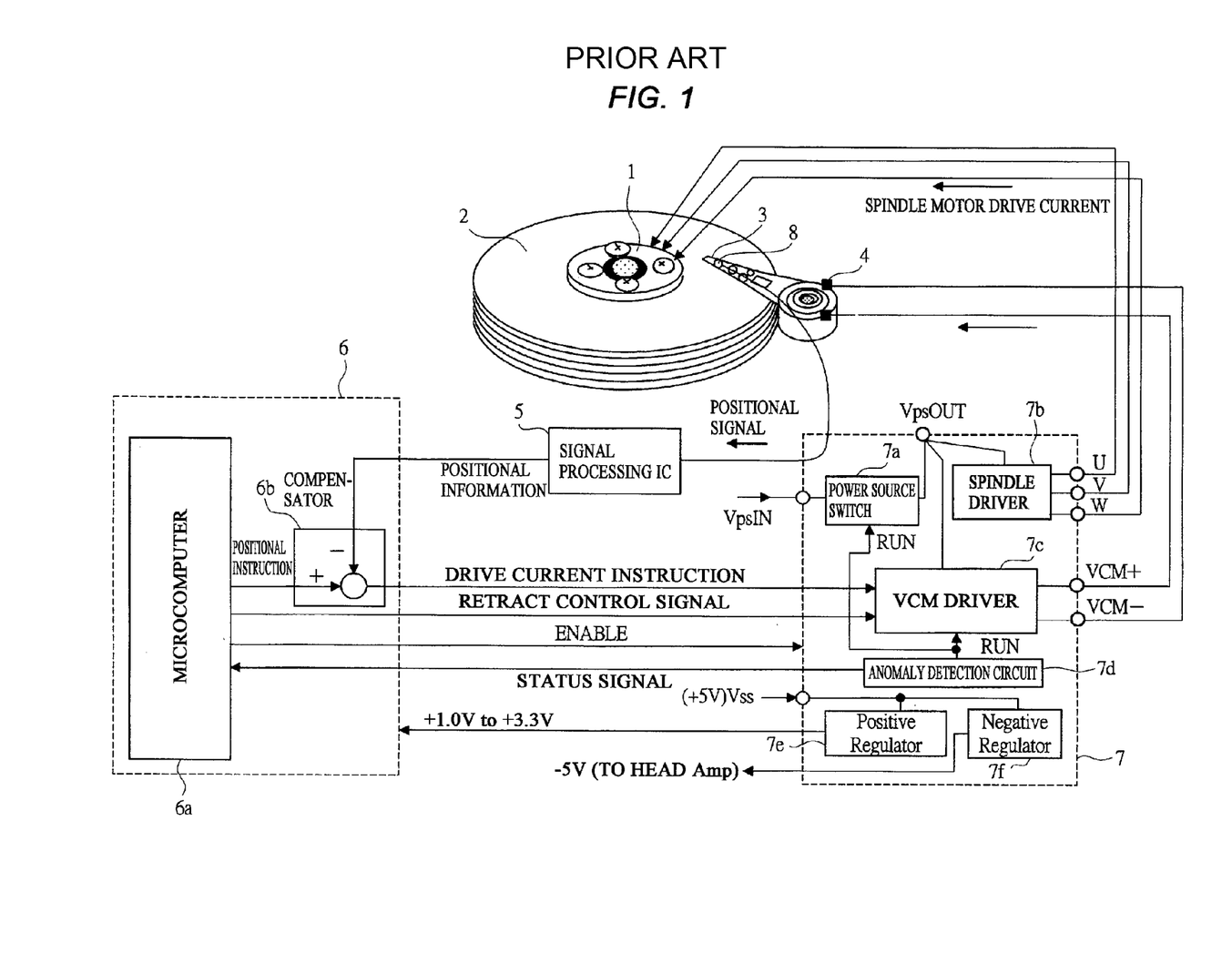
FIG. 1 is a schematic diagram showing a relationship between a hard disc device according to the present invention and a positioning control system of its head.

FIG. 1 is a schematic diagram showing a relationship between a hard disc device according to the present invention and a positioning control system of its head.

A hard disc device to be controlled is configured to include a spindle motor 1, a disc 2, a head 3, a VCM 4, and a head amplifier 8.

The spindle motor 1 is a three-phase motor to rotate the disc 2. The spindle motor 1 is operated by a spindle motor drive current output from a motor drive circuit 7, to be described later.

The disc 2 is a recording medium. In this specification, explanation is given on the assumption that the disc 2 is a magnetic disc.

The head 3 is a magnetic head used to write data to the disc 2 and read data from the disc 2. The positional information of the head 3 is input to a signal processing IC 5, to be described later.

The VCM 4 is a voice coil motor that generates a drive force to cause the head 3 to move in the radial direction of the disc 2.

The head amplifier 8 is an amplifier having a read amplifier that amplifies a signal read from the head 3 and a write amplifier that converts written data into a current. It is necessary for the head amplifier 8 to bias the head 3 to the ground potential in order to protect the head 3 when it comes into contact with the disc 2. Consequently, the head amplifier 8 requires a negative potential.

Peripheral circuits of the hard disc device include the signal processing IC 5, a controller 6, and the motor drive circuit 7.

The signal processing IC 5 is a signal processing circuit that performs analog-digital conversion and format conversion so that the controller 6 can easily handle the positional information read by the head 3. The output of the signal processing IC 5 is input to the controller 6.

The controller 6 is a control circuit to control the motor drive circuit 7 based on the positional information read by the head 3 after the conversion by the signal processing IC 5.

The controller 6 includes a microcomputer 6a and a compensator 6b.

The microcomputer 6a is the main constituent section of the controller 6. The microcomputer 6a controls the head by outputting a positional instruction, a retract control signal, and an ENABLE signal to control the motor drive circuit 7. A status signal is input to the microcomputer 6a and the microcomputer 6a controls with reference to this signal.

The compensator 6b receives the positional instruction from the microcomputer 6a and the positional information from the signal processing IC 5 and outputs the difference between them to the motor drive circuit 7 as a drive current instruction.

The motor drive circuit 7 is a drive circuit that receives the signal from the controller 6 and generates drive currents corresponding to the U-phase, V-phase, and W-phase of the spindle motor 1, respectively, and the drive voltages VCM(+) and VCM(−) to drive the VCM 4.

The motor drive circuit 7 is configured to include a power source switch 7a, a spindle driver 7b, a VCM driver 7c, an anomaly detection circuit 7d, a positive regulator 7e, and a negative regulator 7f.

The power source switch 7a is a power source circuit to generate a power source voltage used internally from a power source voltage from outside (VpsIN in the figure). Although not shown in the figure, the VpsIN is input also to the anomaly detection circuit 7d.

The spindle driver 7b is a three-phase motor driver to generate/output a U-phase current, a V-phase current, and a W-phase current (referred to as "spindle motor drive current" three altogether) to be supplied to the spindle motor 1.

The VCM driver 7c is a drive circuit that generates the drive voltages VCM(+) and VCM(−) to drive the VCM 4. The current at the time of retraction flows from the VCM(+) to the VCM(−).

The anomaly detection circuit 7d is an anomaly detection circuit that monitors various supplied power sources (VpsIN, Vss), the internal reference voltage, the voltage of the feedback node of the output voltage of the positive regulator 7e, the current that flows to the power source switch 7a, the internal temperature, the update frequency of the instruction of the drive current, etc.

The objects to be monitored by the anomaly detection circuit 7d include the internal temperature. This is because when anomaly, such as a short circuit of the drive voltages VCM(+) and VCM(−) to the ground, occurs, an unexpectedly high current flows to the VCM driver 7c, and therefore, the short circuit can be detected by detecting the internal temperature. By outputting the detection result to the controller 6 from the anomaly detection circuit 7d, it is possible for the controller 6 to instruct the motor drive circuit 7 to perform the retract operation via a retract control signal.

From the anomaly detection circuit 7d, a RUN signal is output to the VCM driver 7c and the power source switch 7a. By this signal, each circuit is instructed to start its operation.

The positive regulator 7e is a constant voltage circuit that generates a positive potential used by the controller 6.

The negative regulator 7f is a constant voltage circuit that generates a negative voltage used by the head amplifier 8.

Next, the difference between a conventional VCM driver and the VCM driver 7c according to the present invention is explained.

Figure 2:
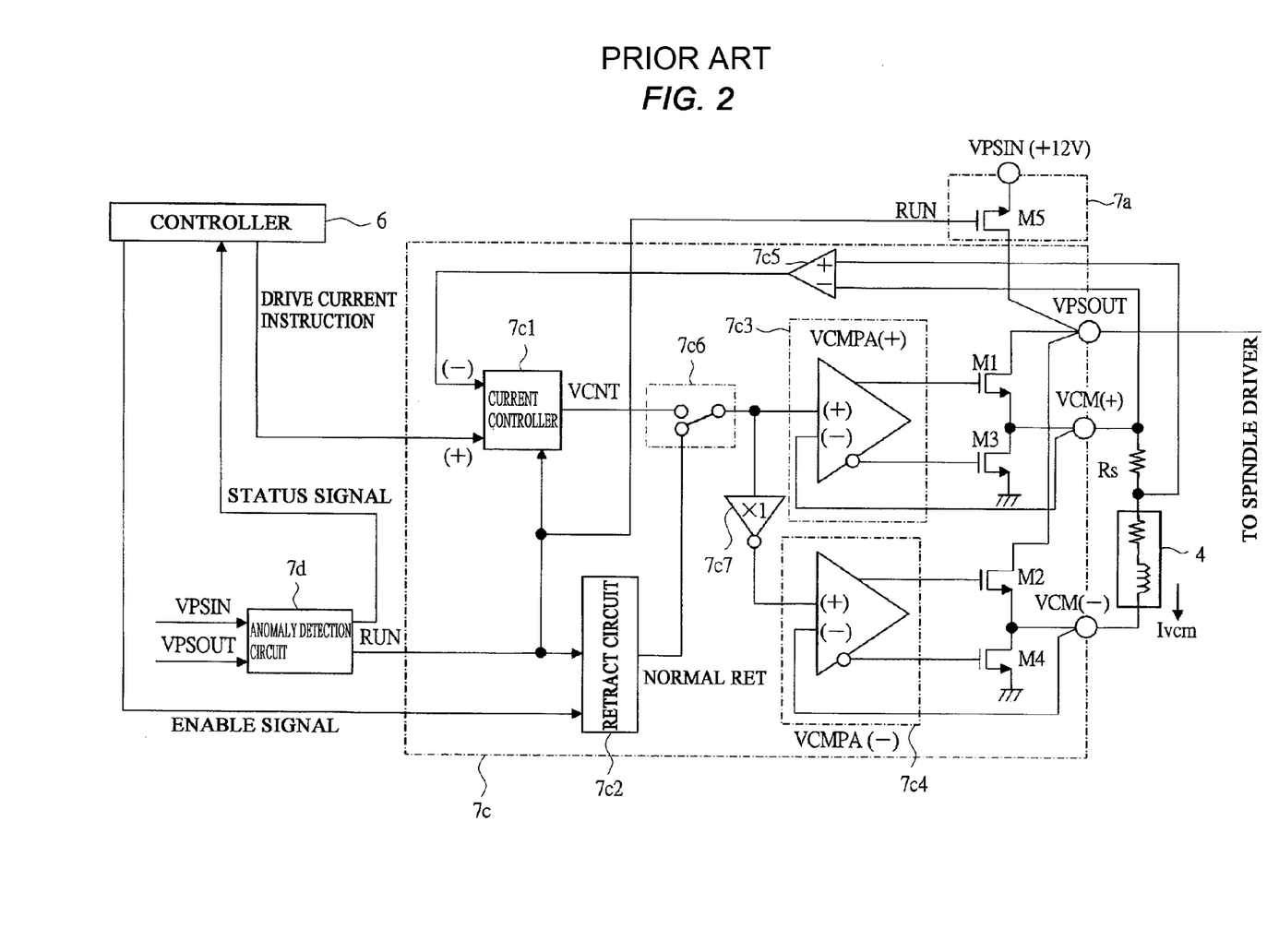
FIG. 2 is a circuit diagram showing a configuration of a conventional VCM driver.
Figure 3:
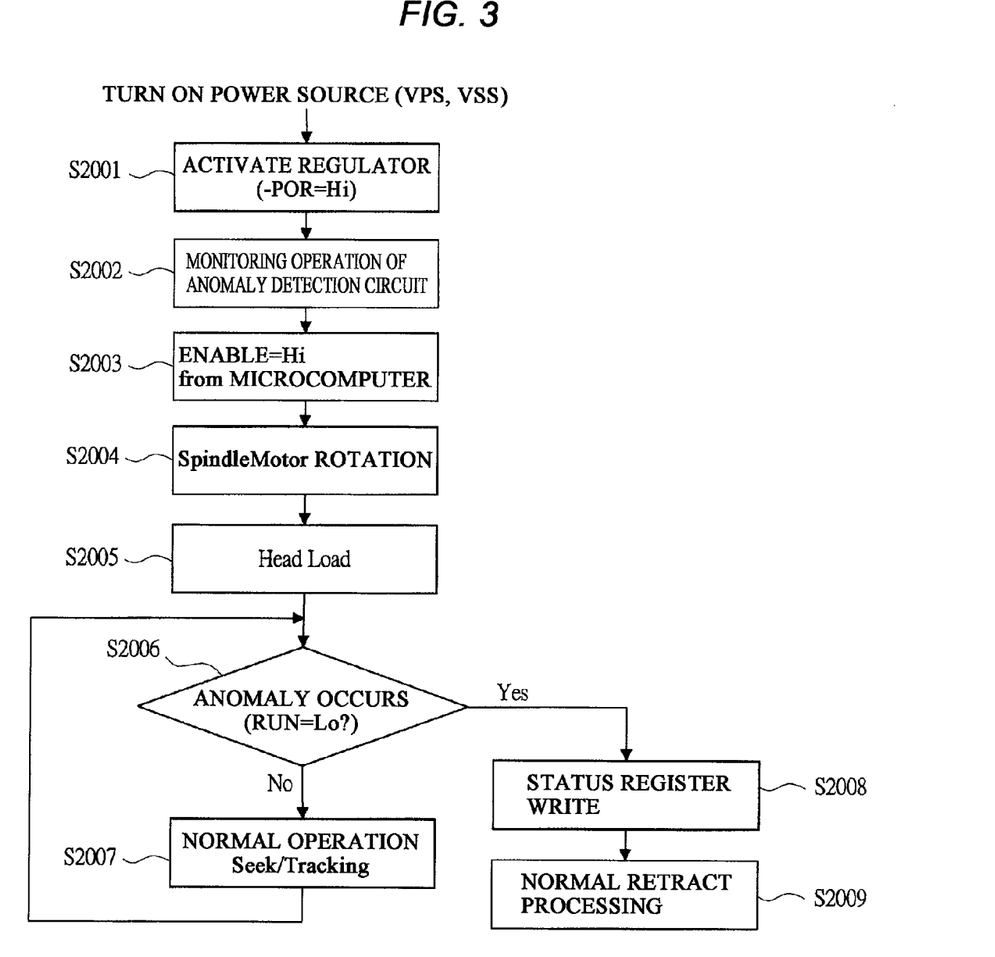
FIG. 3 is a flowchart showing the operation of a hard disc device including the conventional VCM driver.
Figure 4:
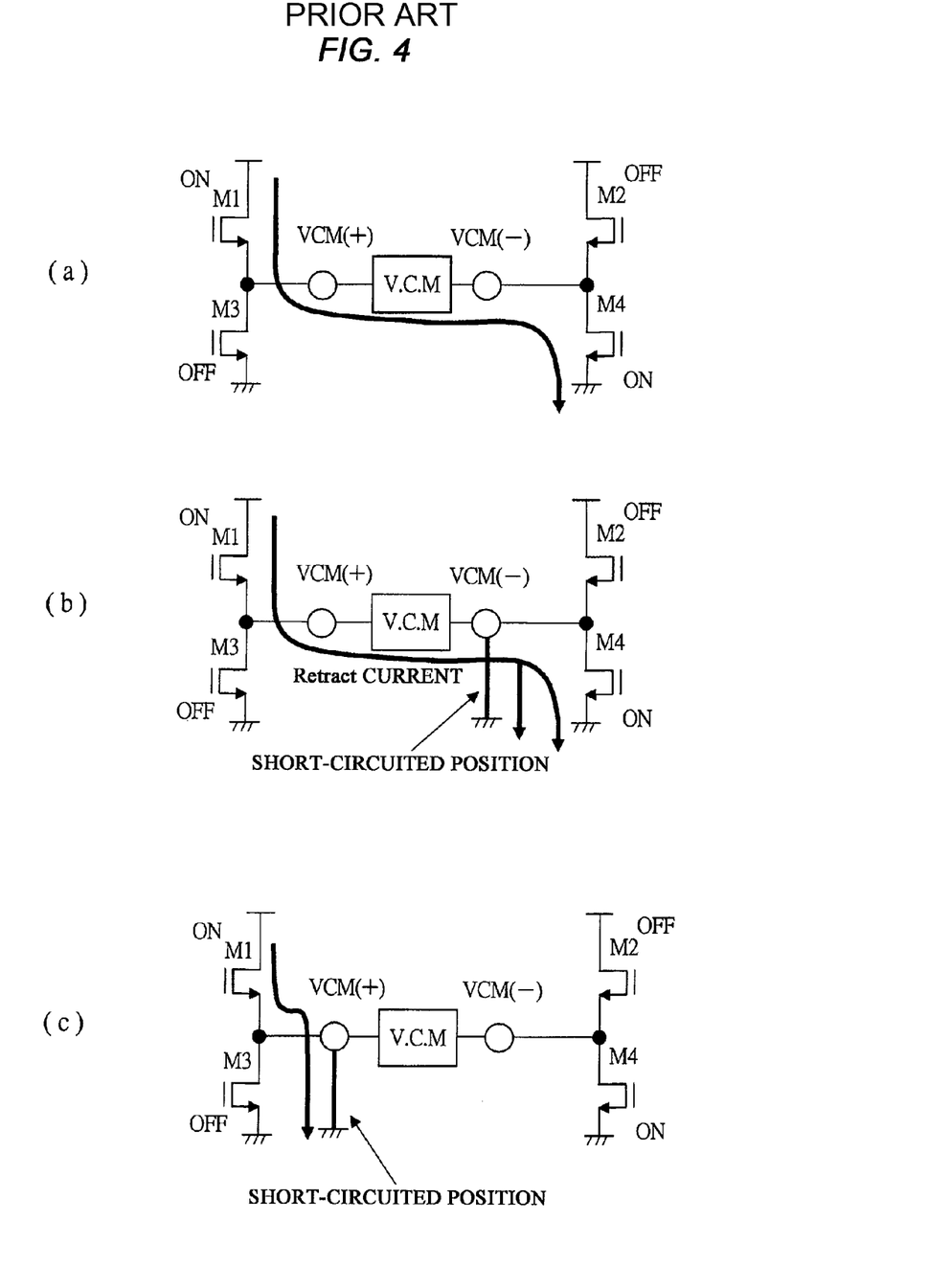
FIG. 4(a), FIG. 4(b) and FIG. 4(c) are conceptual diagrams of normal retract processing of the hard disc device including the conventional VCM driver.

FIG. 2 is a circuit diagram showing a configuration of a conventional VCM driver. FIG. 3 is a flowchart showing the operation of a hard disc device including the conventional VCM driver. FIG. 4(a), FIG. 4(b) and FIG. 4(c) are conceptual diagrams of the normal retract processing of the hard disc device including the conventional VCM driver.

First, components included in the conventional VCM driver are explained.

A current controller 7c1 is a controller that feeds back the drive current instruction from the controller 6 and the output of a current sense amplifier 7c5 and adjusts the amount of current that flows to the VCM 4. To the current controller 7c1, the RUN signal is input and the amount of current is adjusted only when the RUN signal is "H".

A retract circuit 7c2 is a circuit to retract the head 3 based on either input of the RUN signal from the anomaly detection circuit 7d or the ENABLE signal from the controller 6. When the RUN signal or the ENABLE signal becomes active, the retract circuit 7c2 outputs a normal RET signal to a VCMPA (+) 7c3 and a VCMPA(−) 7c4.

The VCMPA(+) 7c3 and the VCMPA(−) 7c4 are each a power amplifier having an H-bridge configuration to perform the differential operation and switches subordinately existing switches M1 and M3 (subordinate to the VCMPA(+) 7c3) and switches M2 and M4 (subordinate to the VCMPA(−) 7c4), respectively. As is obvious also from the figure, the VCMPA (+) 7c3 generates outputs, one is "H" and the other is "L", to the subordinate switches M1 and M3. Similarly, the VCMPA (−) 7c4 generates outputs, one is "H" and the other is "L", to the subordinate switches M2 and M4.

The current sense amplifier 7c5 is an operational amplifier that detects a current to be supplied to the VCM driver using a resistor Rs.

A switch 7c6 is a switch used to determine whether to control the VCM driver 7c with a feedback circuit including the current sense amplifier 7c5, the current controller 7c1, and the VCMPA(+) 7c3 or to forcedly move the head by the instruction, such as the ENABLE signal by the controller. When anomaly occurs, the coupling is switched to the retract circuit output from the current control loop side.

An inverter 7c7 is an inverter present for the H-bridge configuration by the VCMPA(+) 7c3 and the VCMPA(−) 7c4.

Next, the operation of the conventional circuit is explained using FIG. 3.

When power is turned on, the positive regulator 7e and the negative regulator 7f operate and thereby the positive potential and the negative potential each reach a predetermined level (step S2001).

When the positive potential and the negative potential become stable, the anomaly detection circuit 7d monitors the internal information (its contents are described already) of the hard disc device (step S2002). When the conditions to be monitored are no longer problematic to the activation of the hard disc device, the anomaly detection circuit 7d changes the RUN signal to "H" to turn ON the operations of the power source switch 7a, the current controller 7c1 in the VCM driver 7c, and the retract circuit 7c2. At the same time, the anomaly detection circuit 7d notifies the controller 6 that there is no anomaly by a status signal.

When notified that there is no anomaly by the status signal, the microcomputer 6a of the controller 6 changes the ENABLE signal to "H" (step S2003). Due to this, the operation of the retract circuit 7c2 is started and at the same time, the head 3 is moved (loaded) to a position where the disc 2 is read (step S2005).

When the RUN signal changes to "H", the supply of the power source voltage VpsIN to VpsOUT is started. Due to this, the spindle motor 1 begins to rotate (step S2004). In the figure, after step S2003, step S2004 starts. However, the start timings of these two kinds of processing may be reversed. The steps up to the above correspond to the initial operation after power is turned on.

In either way, it is made possible to read data recorded in the hard disc device or to record data in the hard disc device after the initial operation is completed. During the period of the normal operation, detection of anomaly (step S2006) and data read/write processing (step S2007), such as seek and tracking, are performed appropriately.

While the hard disc device operates normally (step S2006: No), seek and tracking are repeated. However, when the anomaly detection circuit 7d detects anomaly (step S2006: Yes), the anomaly detection circuit 7d rewrites the status register (step S2008). Due to this, the status signal output from the anomaly detection circuit 7d to the microcomputer 6a changes and thereby the microcomputer 6a detects the anomaly.

After detecting anomaly, the microcomputer 6a changes the ENABLE signal to "H" to move to the normal retract processing (step S2009). Due to this, the retract circuit 7c2 inputs a desired signal to the VCMPA(+) 7c3 and the VCMPA (−) 7c4 and causes a current to flow to the VCM 4 to start the retract operation. As a result, the head 3 returns to the position before step S2005 and thereby it is made possible to prevent data from being destroyed by the contact between the disc 2 and the head 3.

The problem of the conventional normal retract processing is explained using FIG. 4(a), FIG. 4(b) and FIG. 4(c).

FIG. 4(a) is a diagram for explaining the operation of the normal retract when no short circuit occurs. When performing the normal retract processing, the switches M1 and M3 are controlled by the VCMPA(+) 7c3 and the switches M2 and M4 by the VCMPA(−) 7c4. Due to this, a voltage supplied via the power source switch 7a is applied to the ground via the VCM 4, and thereby, a current flows to the VCM 4. As a result, the retract processing of the head 3 is performed.

FIG. 4(b) is a diagram for explaining the operation of the normal retract when a short circuit occurs on the VCM(−) side. In this case, a current flows to the ground via the short-circuited position not the switch M4. However, a current flows to the VCM 4, and therefore, the retract processing of the head 3 is performed in this case also.

However, if a short circuit occurs on the VCM(+) side, the above does not apply. FIG. 4(c) is a diagram for explaining the operation of the normal retract when a short circuit occurs on the VCM(+) side. In this case, the short-circuited position is located on the side of the switches M1 and M3, and therefore, no current flows to the VCM 4. Consequently, the retract processing of the head 3 is not performed. Further, it is also supposed that a high current flows to the switch M1, and therefore, there is a possibility of burnout of the switch M1.

The object of the present invention is for the anomaly detection circuit 7d to grasp a short circuit on the VCM(+) side.

Figure 5:
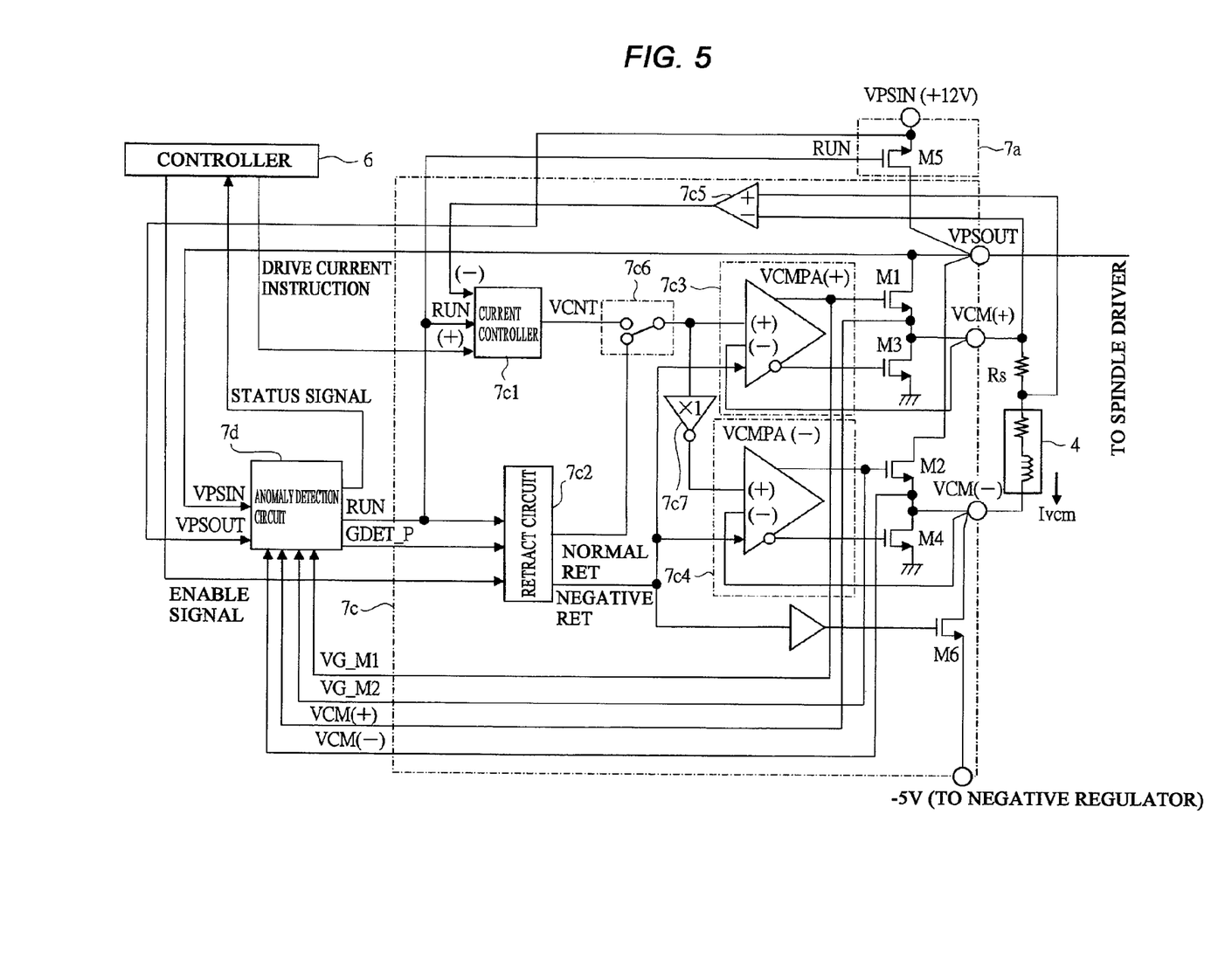
FIG. 5 is a circuit diagram showing a configuration of a VCM driver according to the present invention.

FIG. 5 is a circuit diagram showing the configuration of the VCM driver 7c according to the present invention. Looking at the difference between FIG. 5 and FIG. 2 will surface the object of the present invention.

The retract circuit 7c2 according to the present invention differs from the conventional retract circuit 7c2 in that a GDET_P signal is input from the anomaly detection circuit 7d. When the RUN signal is input from the anomaly detection circuit 7d, the retract circuit 7c2 checks the GDET_P signal. When the GDET_P signal is "H", the retract circuit 7c2 outputs the negative RET signal to the VCMPA(+) 7c3, the VCMPA(−) 7c4, and a switch M6 regarding that a short circuit has occurred on the VCM(+) side. On the other hand, when the RUN signal is input, if the GDET_P signal is "L", or when the ENABLE signal is input, the retract circuit 7c2 outputs the normal RET signal.

The VCMPA(+) 7c3 and the VCMPA(−) 7c4 are characterized by inputting the above-described negative RET signal. The VCMPA(+) 7c3 and the VCMPA(−) 7c4 are characterized by turning off all the subordinate switches when the negative RET signal is input.

The switch M6 is a switch used to control whether to couple the VCM(−) terminal and the negative regulator 7f. When the negative RET signal becomes active, the VCM(−) terminal and the negative regulator 7f are coupled and the potential of the VCM(−) terminal is reduced.

Unlike the conventional anomaly detection circuit 7*d*, to the anomaly detection circuit 7*d* of the present invention, the VCM(+) terminal and the VCM(−) terminal, the coupling points with the VCM 4, and the base terminals of the switches 141 and M2 are also input. By using these, it is made possible to grasp a short circuit on the VCM(+) side.

Figure 6:
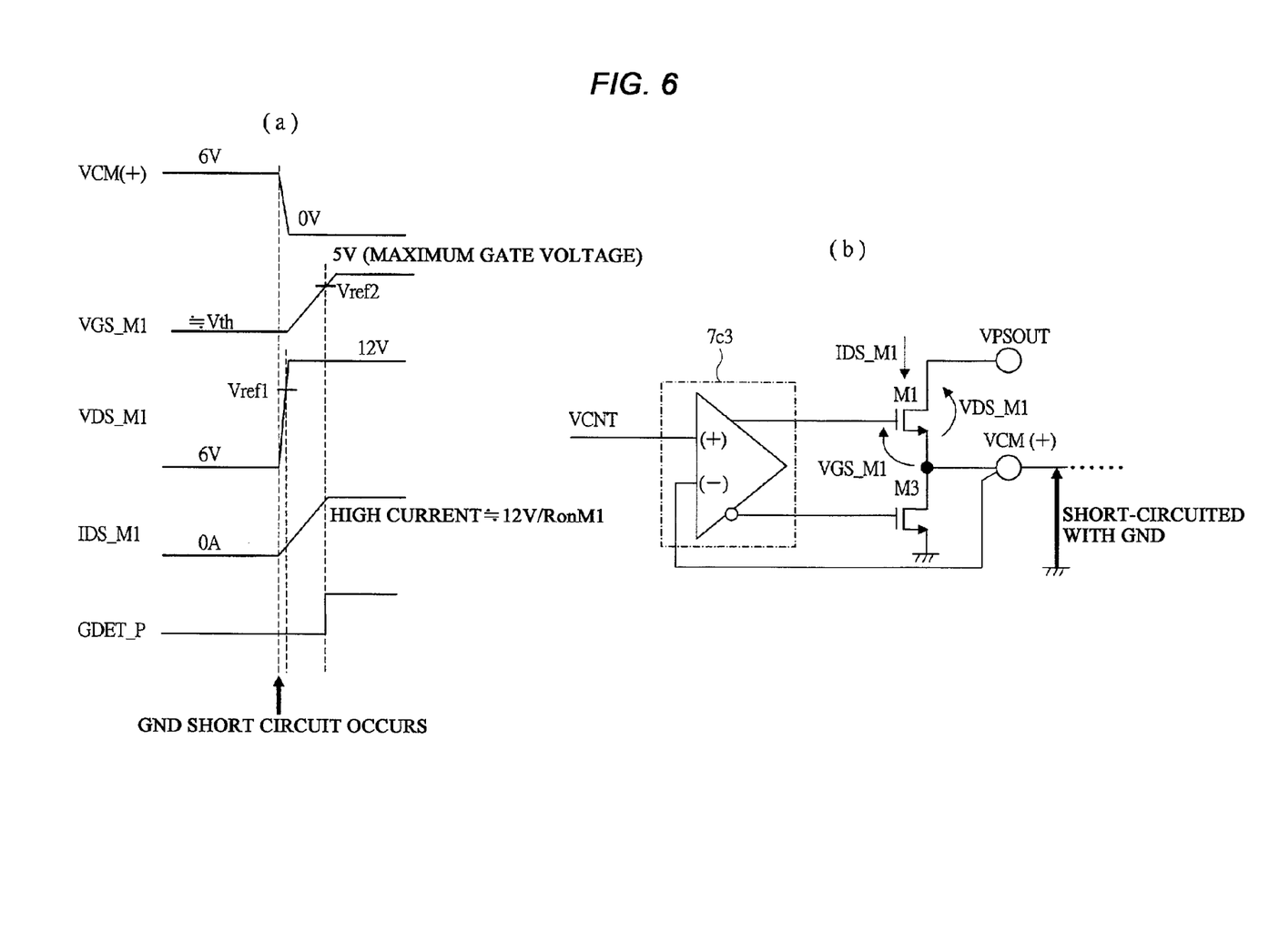
FIG. 6(a) and FIG. 6(b) are conceptual diagrams for explaining a method of detecting a short circuit on the VCM (+) side according to the present invention.

FIG. 6(*a*) and FIG. 6(*b*) are conceptual diagrams for explaining a short circuit detection method on the VCM(+) side according to the present invention.

FIG. 6(*a*) is a waveform diagram showing the change at each terminal when a shirt circuit occurs on the VCM(+) side and FIG. 6(*b*) is a circuit diagram showing a position detected by the waveform in FIG. 6(*a*). The detection method is explained using these figures.

When a short circuit occurs on the VCM(+) side, the VCM (+) drops to 0 V (ground potential) and at the same time, the voltage between drain and source (VDS_M1) and the voltage between gate and source (VGS_M1) of the switch M1 begin to rise accordingly by an amount corresponding thereto (FIG. 6(*a*) "short circuit of GND occurs").

When the voltage between drain and source (VDS_M1) and the voltage between gate and source (VGS_M1) exceed fixed voltages defined for both (in the figure, Vref1 for the voltage between drain and source and Vref2 for the voltage between gate and source), respectively, the anomaly detection circuit 7*d* determines that a short circuit has occurred. Then, the anomaly detection circuit 7*d* changes the GDET_P signal to "H" and notifies the content of the trouble, that is, the short circuit in the VCM(+) to the retract circuit.

Figure 7:
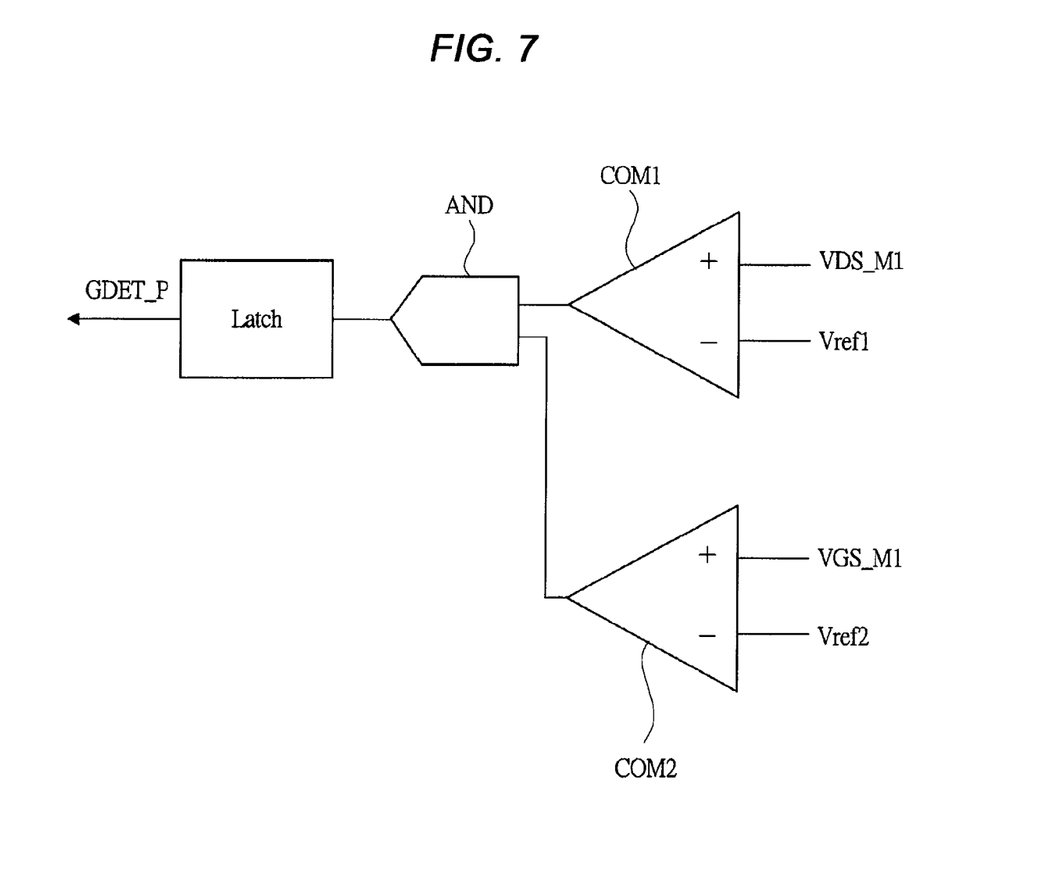
FIG. 7 is a logic circuit diagram showing a configuration of a region where a short circuit is detected in the VCM(+) in the anomaly detection circuit according to the present invention.

FIG. 7 shows the above in a logic circuit. FIG. 7 is a logic diagram showing a configuration of a region that detects a short circuit in the VCM(+) of the anomaly detection circuit 7*d* according to the present invention.

That is, there are provided comparators COM1 and COM2 that compare the voltage between drain and source (VDS_M1) with the Vref1 and the voltage between gate and source (VGS_M1) with the Vref2, respectively.

The comparator COM1 compares the voltage between drain and source (VDS_M1) with the Vref1. When the voltage between drain and source (VDS_M1) exceeds the voltage value of the Vref1, the comparator COM1 outputs "H".

Similarly, the comparator COM2 compares the voltage between gate and source (VGS_M1) with the Vref2. When the voltage between gate and source (VGS_M1) exceeds the voltage value of the Vref2, the comparator COM2 outputs "H".

The outputs of these comparators COM1 and COM2 are input to a logical product gate AND that calculates a logical product. Consequently, when both the voltage between drain and source and the voltage between gate and source become "H", the logical product gate AND outputs "H". The output of the logical product gate AND is latched and thereby the short circuit in the VCM(+) is stably notified to the retract circuit. The signal of the notification of the short circuit in the VCM (+) is the GDET_P.

Figure 10:
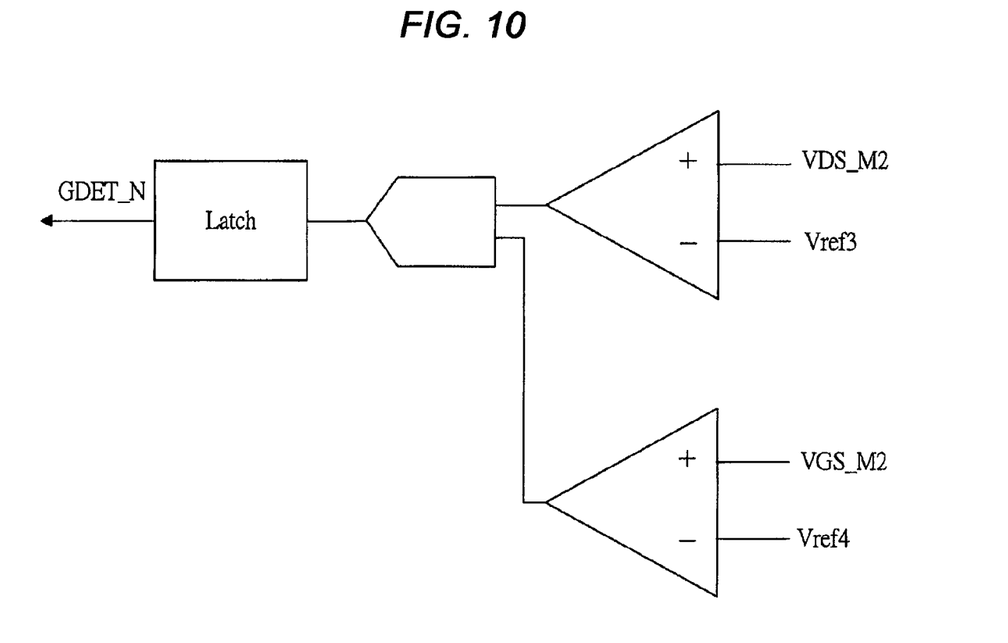
FIG. 10 is a logic circuit diagram showing a configuration of a region where a short circuit is detected in the VCM(−) in the anomaly detection circuit according to the present invention.

It is also made possible for the VCM(−) side to detect a short circuit by employing the same circuit configuration. FIG. 10 is a logic circuit diagram showing a configuration of a region that detects a short circuit in the VCM(−) of the anomaly detection circuit according to the present invention. However, as described above, even if a short circuit occurs on the VCM(−) side, it is possible for the VCM 4 to operate and to retract the head 3 in the current configuration, and therefore, the anomaly detection circuit 7*d* in the present embodiment does not output the GDET_N.

In FIG. 5, VG_M2 and VCM(−) used to generate the GDET_N are input to the anomaly detection circuit 7*d*. If not necessary, these signal lines may not be input to the anomaly detection circuit 7*d*.

Figure 8:
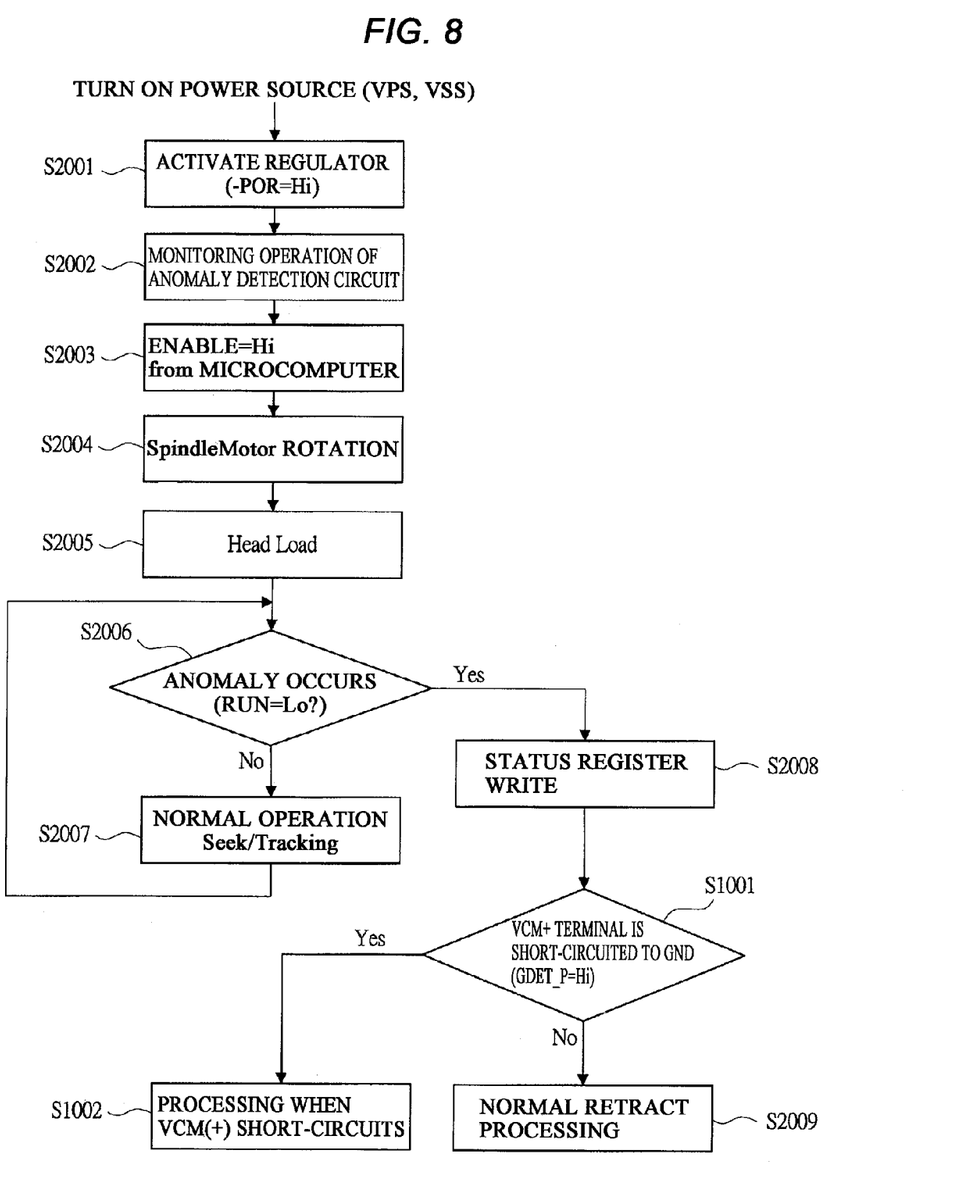
FIG. 8 is a flowchart showing the operation of a hard disc device including the VCM driver according to the present invention.

FIG. 8 is a flowchart showing the operation of the hard disc device including the VCM driver according to the present invention. While the operation is normal, the processing is the same as the conventional processing (step S2001 to step S2008 in FIG. 3) and its explanation is omitted.

When the anomaly detection circuit 7*d* detects anomaly (step S52006: Yes), the anomaly detection circuit 7*d* rewrites the status register (step S2008). Consequently, the status signal output from the anomaly detection circuit 7*d* to the microcomputer 6*a* changes and the microcomputer 6*a* detects the anomaly as a result.

In the present invention, after detecting anomaly, the retract circuit 7*c*2 in FIG. 5 refers to the GDET_P output from the anomaly detection circuit 7*d* (step S1001). When the GDET_P is "H" (step S1001: Yes), the retract circuit 7*c*2 determines that VCM(+) short-circuits and outputs the negative RET signal. Consequently, the procedure moves to the processing when VCM(+) short-circuits (step S1002). On the other hand, when the GDET_P is "L" (step S1001: No), the retract circuit 7*c*2 performs the normal retract processing as before (step S2009).

Figure 9:
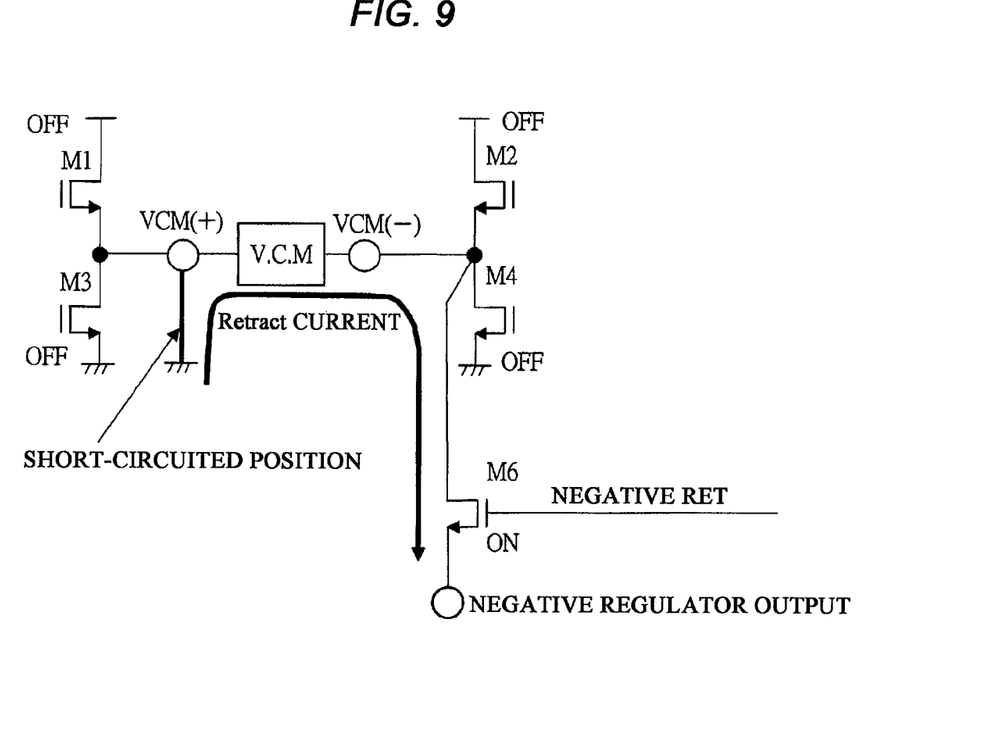
FIG. 9 is a conceptual diagram showing the operation when a negative RET signal is output.

FIG. 9 is a conceptual diagram showing the operation when the negative RET signal is output (=operation in step S1002).

When the retract circuit 7*c*2 outputs the negative RET signal, the VCMPA(+) 7*c*3 and the VCMPA(−) 7*c*4 turn off all the subordinate switches M1, M2, M3, and M4. On the other hand, the VCMPA(+) 7*c*3 and the VCMPA(−) 7*c*4 turn on the switch M6 that switches the coupling with the negative regulator to another.

Consequently, a current flows from the short-circuited position at 0 V to the negative regulator 7*f*. Because of this, the VCM4 operates and the retraction of the head 3 is enabled.

The embodiments of the invention made by the inventors of the present invention are explained as above, however, it is obvious that the present invention is not limited to the embodiments but various modifications are possible in the scope not deviating from its gist.

As described above, the present invention is used for the retract operation of a head of a hard disc drive.

What is claimed is:

1. A hard disc device control circuit for use with a voice coil motor, the hard disc device control circuit comprising:
   a first switch that controls the supply of current from a constant current source to the voice coil motor;
   an amplifier circuit that drives a gate terminal of the first switch; and
   an anomaly detection circuit,
   wherein the first switch has a source terminal, a drain terminal, and the gate terminal, and
   wherein the anomaly detection circuit detects a short circuit of an input end on the high potential side of the voice coil motor by monitoring the voltage between gate and source and the voltage between drain and source of the first switch.

2. The hard disc device control circuit according to claim 1, further comprising:
   a first comparator that compares the voltage between gate and source with a first threshold voltage and which becomes active when the voltage between gate and source exceeds the first threshold voltage; and
   a second comparator that compares the voltage between drain and source with a second threshold voltage and which becomes active when the voltage between drain and source exceeds the second threshold voltage, wherein the anomaly detection circuit detects a short circuit by determining that a short circuit has occurred in the input end of the high potential side of the voice coil motor when both the first comparator and the second comparator become active.

3. The hard disc device control circuit according to claim 2, further comprising:

a negative regulator that generates a negative potential; and a second switch that controls the coupling between the negative regulator and the input end on the low potential side of the voice coil motor, wherein the anomaly detection circuit couples the negative regulator and the input end on the low potential side of the voice coil motor via the second switch when a short circuit occurs in the input end on the high potential side of the voice coil motor.

4. The hard disc device control circuit according to claim 3, wherein the anomaly detection circuit terminates the supply of current from the constant current source to the voice coil motor via the amplifier circuit and the first switch when a short circuit occurs in the input end on the high potential side of the voice coil motor.

* * * * *